United States Patent [19]
Hughes

[11] Patent Number: 4,555,138
[45] Date of Patent: Nov. 26, 1985

[54] NURSE'S SEAT

[75] Inventor: Robert S. Hughes, Imlay City, Mich.
[73] Assignee: R. S. Hughes Ind. Inc., Capac, Mich.

[21] Appl. No.: 543,393
[22] Filed: Oct. 19, 1983
[51] Int. Cl.[4] ............ B60N 1/08; B60N 1/02
[52] U.S. Cl. ............ 297/346; 297/335; 297/344; 296/65 R
[58] Field of Search ............ 297/330, 311, 344, 331, 297/346, 335; 104/110, 247; 296/65 R

[56] References Cited

U.S. PATENT DOCUMENTS

| | | | |
|---|---|---|---|
| 821,704 | 5/1906 | Conway | 297/344 |
| 1,167,932 | 1/1916 | Robertson | 297/344 |
| 1,430,465 | 9/1922 | Hiemuth | 297/344 |
| 2,310,346 | 2/1943 | Bell | 297/346 |
| 2,641,308 | 6/1953 | Bock | 297/335 |
| 2,838,094 | 6/1958 | Janning | 297/335 |
| 2,963,074 | 12/1960 | Woodard | 297/346 |
| 3,044,829 | 7/1962 | Dolgorukov | 297/344 |
| 3,073,560 | 1/1963 | Montgomery | 297/335 |
| 3,130,968 | 4/1964 | DeFeen | 297/344 |
| 3,922,970 | 12/1975 | Glastra | 104/247 |
| 3,937,297 | 2/1976 | Jacobs et al. | 297/330 |
| 3,993,280 | 11/1976 | Surbaugh | 297/346 |
| 4,423,685 | 1/1984 | Kerckhoff | 104/247 |

FOREIGN PATENT DOCUMENTS

| | | | |
|---|---|---|---|
| 34007 | 8/1908 | Austria | 104/247 |
| 2750406 | 5/1979 | Fed. Rep. of Germany | 297/344 |

*Primary Examiner*—William E. Lyddane
*Assistant Examiner*—Mark W. Binder
*Attorney, Agent, or Firm*—Gifford, Van Ophem, Sheridan, Sprinkle & Nabozny

[57] ABSTRACT

The present invention provides a nurse's seat for tending to a plurality of patient stations which are spaced apart from each other such as, for example, in an ambulance. The nurse's seat comprises an elongated and substantially horizontal track which extends between and adjacent the patient's stations. A frame is slidably mounted to the track and carries a swivelly mounted seat on which the nurse sits. In the preferred form of the invention, the nurse's seat is vertically slidably movable with respect to the frame to accomodate vertically stacked patient's stations. In addition, a locking pin selectively locks the frame to the track at any of a plurality of predetermined positions.

4 Claims, 6 Drawing Figures

90
96
80
82
30
48
10
88
50
70
84
86
72
22
40
42
44
26
36
38
20
58
56
60
48
62
54
44
66

100
22
102
106

NURSE'S SEAT

BACKGROUND OF THE INVENTION

I. Field of the Invention

The present invention relates to a nurse's seat for tending a plurality of patient stations which are spaced apart from each other.

II. Description of the Prior Art

In military ambulances and like vehicles, a generally elongated and rectangular area is provided for transporting multiple patients. Typically, a plurality of cots or patient's stations are provided along each side of the rectangular area so that the cots are positioned end to end with respect to each other thus leaving a central passageway open. In addition, in many of these previously known vehicles, two vertically spaced rows of patient cots are provided on each side of the central passageway in order to maximize the patient capacity of the ambulance.

The open central passageway in the ambulance not only allows patients to be loaded into and removed from the various patient stations, but also enables a nurse, i.e. a physician or a medic, to attend to the various patients as required. The ability of the nurse to efficiently attend to the patients, however, is greatly hampered since the nurse must move both longitudinally along the ambulance and tend to patients in both the upper and lower rows of cots. The necessity of the nurse to squat in order to treat the patients in the lower row and to stretch to treat the patients in the upper row, all while the ambulance is moving, is very tiring and leads to rapid fatigue for the nurse.

One previously known system to reduce nurse fatigue is to provide a sliding platform along the upper row of patients stations. In use, the nurse sits on the sliding platform when treating patients in the lower rows of patients stations and stands on the ambulance floor when treating the patients in the upper rows.

This previously known nurse's seat, however, has not proven wholly satisfactory in use. One substantial disadvantage of this previously known nurse's seat is that it is awkward to use since the seat extends entirely between the lower rows of patients stations. A still further disadvantage of this previously known seat is that it is still fatiguing for the nurse to repeatedly and alternately sit on the seat and stand on the ambulance floor.

SUMMARY OF THE PRESENT INVENTION

The present invention provides a nurse's seat which overcomes all of the above mentioned disadvantages of the previously known devices.

In brief, the nurse's seat of the present invention comprises a frame having one part which is longitudinally slidably mounted to a pair of elongated tracks secured along one side of the central ambulance passageway. A locking pin assembly is carried by this first frame part and allows the nurse to selectively lock the first frame part to the track at any of a plurality of predetermined positions.

The frame also comprises a second part having a seat swivelly mounted to its upper end. This second frame part is vertically slidably mounted to the first frame part and can be selectively locked by the nurse in either its upper or lower positions as well as a plurality of positions therebetween.

In operation, the nurse sits on the seat and longitudinally slides the frame along the track to the desired patient station and then locks the frame to the track. Thereafter, the nurse can move the second frame part to its position in order to treat a patient in the lower row of patient stations or, conversely, move the second frame part to its upper position in order to treat patients in the upper row of patient stations. The swivelly mounted seat on the second frame part further enables the nurse to tend to patients on either side of the ambulance central passageway.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE INVENTION

Figure 1:
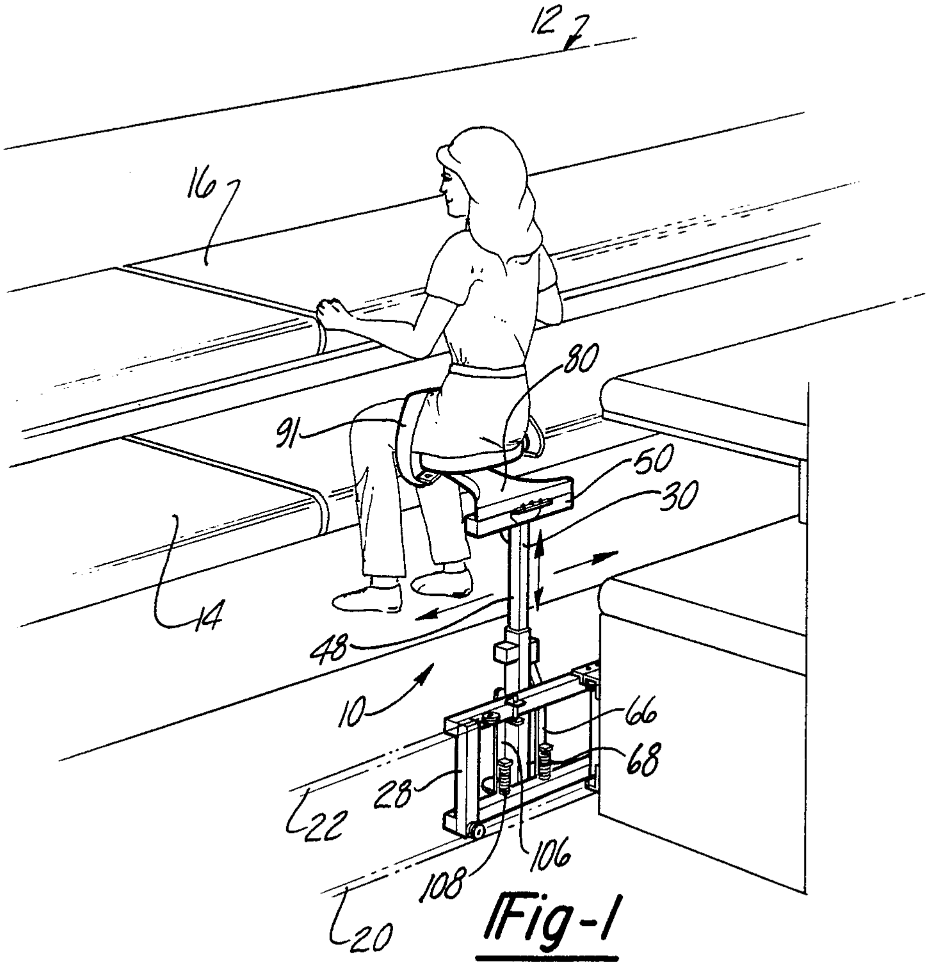
FIG. 1 is a fragmentary perspective view illustrating a preferred cobodiment of the present invention.
Figure 2:
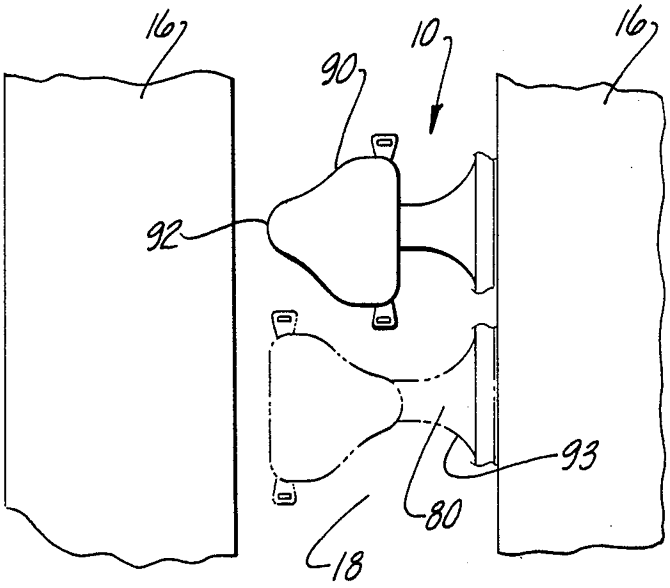
FIG. 2 is a fragmentary top view of the preferred embodiment of the invention.

With reference first to FIGS. 1 and 2 a preferred embodiment of a nurse's seat 10 of the present invention is thereshown for use with a military ambulance 12 or similar installation. The ambulance 12 includes an elongated patient caring section having a bottom row 14 and top row 16 of patient stations. The patient stations in both the lower row 14 and upper row 16 are positioned end to end with respect to each other and, as best shown in FIG. 1, both a lower and upper row 14 and 16 of patient stations are provided on each side of the ambulance 12. The patient stations on both sides of the ambulance 12 are preferrably spaced apart from each other thus leaving a central open passageway 18.

Figure 3:
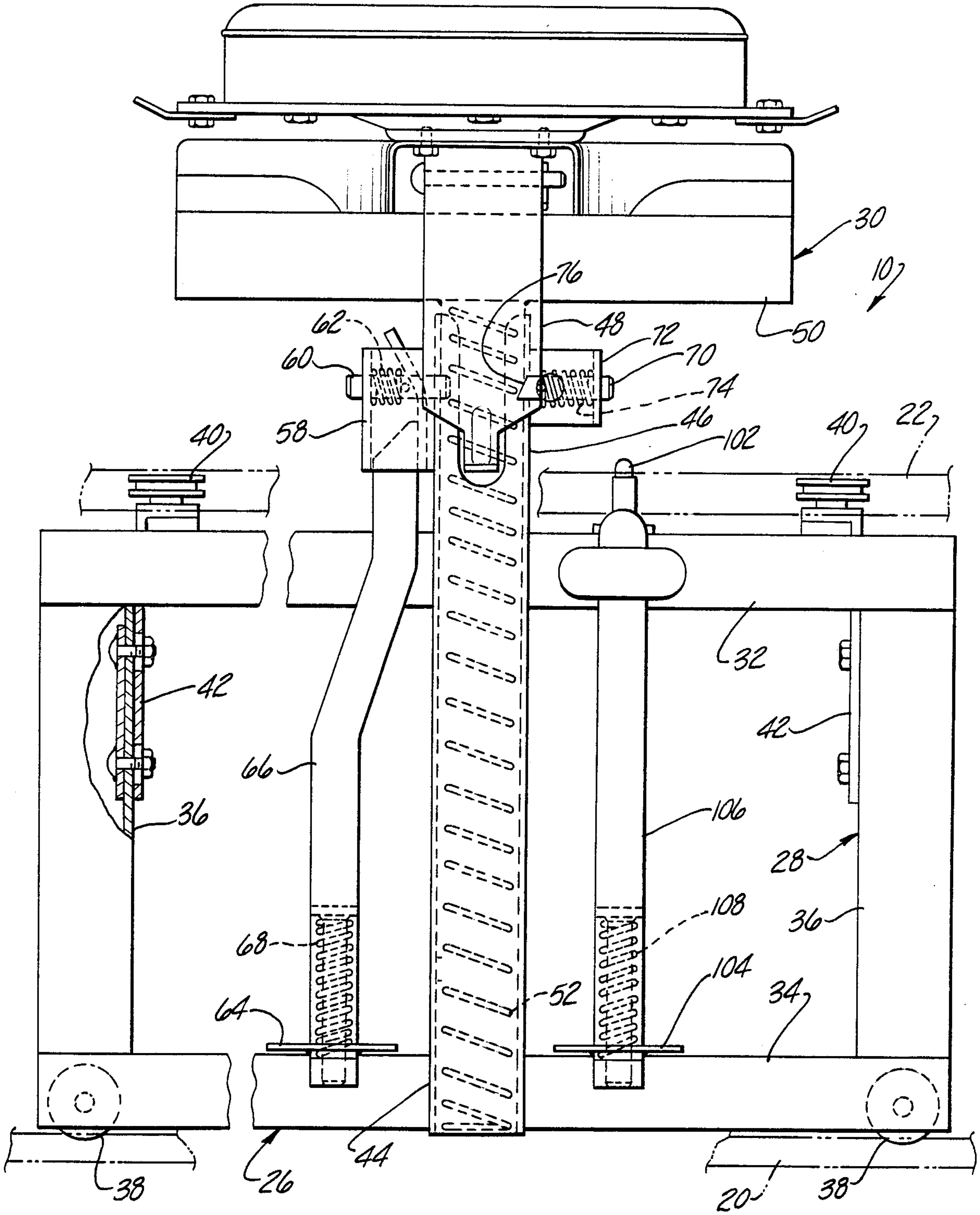
FIG. 3 is a front view of the preferred embodiment of the invention.
Figures 4, 5, 6:
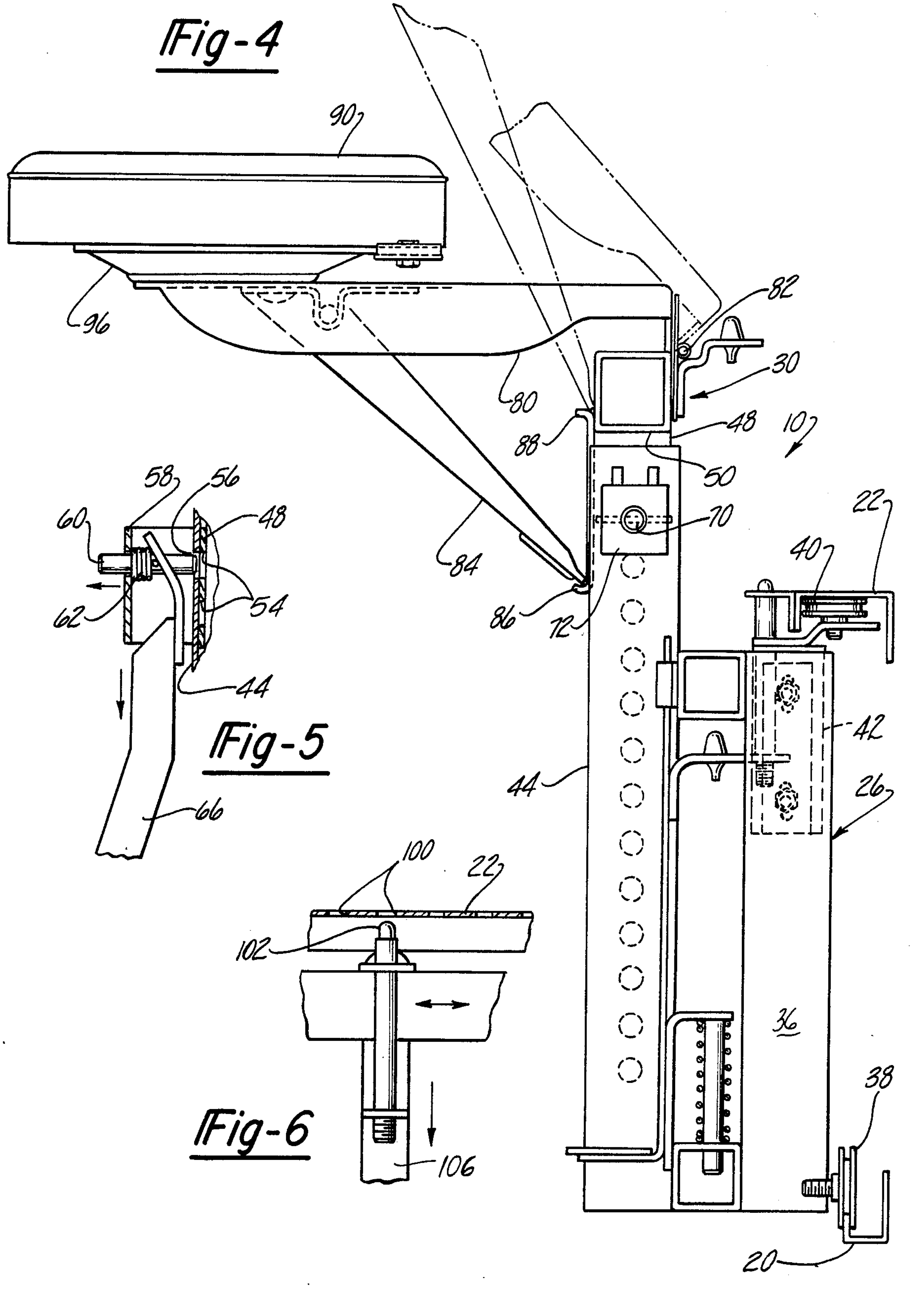
FIG. 4 is a side view of the preferred embodiment of the present invention.
FIG. 5 is a fragmentary view illustrating a portion of the preferred embodiment of the invention.
FIG. 6 is a side view illustrating a portion of the preferred embodiment of the invention.

With reference now to FIGS. 1, 3 and 4, the nurse's seat 10 of the present invention comprises a pair of elongated tracks 20 and 22 which extend longitudinally along the ambulance 12 and on one side of the open central area 18. These tracks 20 and 22 are substantially horizontal and are fixedly secured to the ambulance 12 in any conventional fashion.

Referring now to FIGS. 3 and 4, the nurse's seat 10 comprises a frame 26 having a first lower part 28 and a second upper part 30. The first frame part 28 is generally rectangular in shape and comprises an upper support 32, a lower support 34 and a pair of side supports 36. The supports 32, 34 and 36 may be of any conventional construction, but preferrably are constructed of square metal tubing for low weight and high strength characteristics. Preferably, the supports 32, 34 and 36 are welded together.

Still referring to FIGS. 3 and 4 a pair of rollers 38 are rotatably mounted to each side support 36 near its lower end and these rollers 38 rotatably engage the lower track 20. Similarly, a pair of upper rollers 40 are secured to the side supports 36 adjacent their upper end and are rotatably positioned within the upper track 22. Preferrably, the upper rollers 40 are secured to the side supports 36 by vertically adjustable brackets 42 so that the rollers 40 can be properly positioned with the upper track 22 despite slight differences in spacing between the tracks 20 and 22 on different vehicles.

The first frame part 26 further includes a vertically extending hollow square tube 44 which is fixedly secured between the upper support 32 and lower support 34 at a mid point between the side supports 36. A portion 46 of the tube 44 extends above the upper support 32 for a purpose to be subsequently described.

With reference now to FIGS. 1, 3 and 4 the upper frame part 30 comprises an elongated and vertically extending tube 48 having a cross-support 50 secured to its upper end. The tube 48 is telescopically slidably received within the tube 46 and moveably between an upper position, illustrated in FIG. 1, and a lower position illustrated in FIG. 3. A helical compression spring 52 (FIG. 3) contained within the tube 44 urges the tube 48, and thus the second frame part 30, toward its upper position.

As best shown in FIGS. 3 and 5, a plurality of longitudinally spaced holes 54 (FIG. 4) are provided along one side of the telescoping tube 48 and these holes 54 selectively register with a hole 56 formed in the tube 44 depending upon the vertical position of the second frame part 30 with respect to the first frame part 28. A housing 58 is secured to the upper portion 46 of the tube 44 around the hole 56. This housing 58 carries a pin 60 aligned with the hole 56 while a spring 62 urges the pin 60 through the hole 56 and into a registering hole 54 in the telescoping tube 48. With the pin 60 extending through the hole 56 and one of the holes 54, the pin 60 locks the frame parts 26 and 30 against further vertical movement with respect to each other.

A foot pedal 64 is secured to the first frame part 28 and is mechanically connected to the pin 60 through an elongated lever 66. Upon depression of the foot pedal 64 by the nurse, the lever 66 moves the pin 60 to its retracted position (FIG. 5) in which the pin 60 is withdrawn from the hole 54. When this happens, the second frame part 30 is free to move vertically with respect to the first frame part 28. Upon the subsequent release of the foot pedal 64, a spring 68 (FIG. 3) urges the pedal 64 and lever 66 to their upper position thus returning the pin 60 to its extended position and locking the frame parts 28 and 30 together.

As best shown in FIGS. 3 and 4, a limit pin 70 is carried by a retainer 72 and urged by a spring 74 through a hole in the tube portion 46. This pin 70 registers with a hole near the lower end of the telescoping tube 48 to limit the uppermost extension of the upper frame part 30 from the lower frame part 28. The pin 70 includes a tapered nose 76 which automatically moves the pin 70 to its retracted position upon the subsequent downward movement of the upper frame part 30 into the tube 44.

As best shown in FIGS. 1, 2 and 4, a generally triangular plate 80 is secured by a hinge 82 to the cross support 50 at the upper end of the second frame part 30. A brace 84 (FIG. 4) engages a stop 86 and supports the plate 80 in its lower "in use" position. The plate 80, however, is pivotal to the position shown in phantom line in FIG. 4 to a "storage" position. In its storage position the brace 84 pivots and engages a second stop 88 to maintain the plate 80 in its storage position.

With reference now to FIGS. 2 and 4, a seat 90 having a relatively narrow crotch portion 92 is swivelly mounted by a bearing assembly 96 to the upper surface to the plate 80 at a position spaces away from the patient's station. In use, a seatbelt 91 (FIG. 1) secures a nurse onto the seat 90 and, since the seat 90 can be swivelled as shown in FIG. 2 the nurse can tend to patients along either side of the ambulance. With the seat 90 in the position shown in phantom line in FIG. 2, the crotch portion 92 registers with cut out portion 93 on the plate 80 to provide leg room for the nurse.

As best shown in FIGS. 3 and 6, the upper track 22 includes a plurality of vertically extending openings 100 at longitudinally spaced positions therealong. A locking pin 102 is vertically slidably mounted to the upper support 32 of the lower frame part 26 so that, with the pin 102 in its upper or extended position, (FIG. 3) the pin 102 extends through one of the openings 100 and locks the frame 26 against longitudinal movement with respect to the tracks 22. A pedal 104 mounted to the lower frame part 28 is mechanically secured to the pin 102 by an elongated lever 106. Upon depression of the pedal 104 by the nurse, the pin 102 is moved to its retracted position (FIG. 6) thus permitting the frame 26 to slide along the tracks 20 and 22. Upon release of the pedal 104, a spring 108 returns the pin 102 to its extended position thus again locking the frame 26 to the tracks 20 and 22.

In operation, the seat 90 is moved to its in use position and the nurse, after sitting on the seat 90, secures herself to the seat 90 with the seatbelt 91 as shown in FIG. 1. The nurse then depresses the pedal 104 to unlock the frame 26 from the tracks 20 and 22 and longitudinally moves the frame 26 along the tracks 20 and 22 to the desired patient position and then releases the pedal 104.

Once the nurse is in the desired longitudinal position, the nurse, upon depression of the pedal 64, either raises or lowers the seat 90 to tend to patients in the upper or lower row of patients. Similarly, the nurse swivels the seat as desired to tend to patients on either side of the ambulance.

From the foregoing, it can be seen that the nurse's seat of the present invention provides a simple, effective and relatively inexpensive nurse's seat for a military ambulance or the like.

Having described my invention, however, many modifications thereto will become apparent to those skilled in the art to which it pertains without deviation from the spirit of the invention as defined by the scope of the appended claims.

I claim:

1. A nurse's seat for a vehicle having an elongated passageway with two sides and patient stations on both sides of said passageway comprising:

a pair of elongated tracks, means for attaching said tracks along one side of the passageway so that said tracks are vertically spaced from each other, a frame, means for slidably mounting said frame to said tracks so that said frame is wholly positioned closely adjacent said tracks and said one side of the passageway, said frame having a vertically extending tube open at its top, a seat assembly comprising an elongated support member, a lower end of said support member being telescopically received within said vertically extending tube, a plate having one end secured to an upper end of said support member, said plate having a second end positioned substantially centrally in said passageway, a seat, and means for swivelly mounting said seat to said second end of said plate, means for selectively locking said frame to said tracks at a plurality of longitudinally spaced predetermined positions therealong, means for selectively locking said seat assembly support member between a lowered position and a raised position, means for pivotally securing said plate to said support member for movement between an in use position and a storage position.

2. The invention as defined in claim 1 and comprising means for urging said second frame part towards said upper position.

3. The invention as defined in claim 1 wherein a hole is formed through said track means at each preselected position and wherein said locking means comprises a pin slidably mounted to said frame so that said pin registers with said track means holes, and means for resiliently urging said pin through said holes.

4. The invention as defined in claim 1 wherein said seat comprises a narrow, crotch portion and wherein said support plate has removed portions below and adjacent the crotch portion when said seat is in a predetermined rotational position.

* * * * *